(12) United States Patent
Jin et al.

(10) Patent No.: US 12,728,669 B2
(45) Date of Patent: Sep. 8, 2026

(54) WHEEL AND MOTOR VEHICLE

(71) Applicant: Volvo Car Corporation, Gothenburg (SE)

(72) Inventors: Yongxing Jin, Shanghai (CN); Jiangliu Su, Shanghai (CN); Hongchao Yu, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 380 days.

(21) Appl. No.: 18/534,815

(22) Filed: Dec. 11, 2023

(65) Prior Publication Data

US 2024/0198724 A1 Jun. 20, 2024

(30) Foreign Application Priority Data

Dec. 15, 2022 (CN) ........................ 202211636715.7

(51) Int. Cl.
*B60B 27/00* (2006.01)
*B60B 21/06* (2006.01)
*B60B 27/04* (2006.01)

(52) U.S. Cl.
CPC ........ *B60B 27/0047* (2013.01); *B60B 21/064* (2013.01); *B60B 27/04* (2013.01); *B60B 2900/1216* (2013.01)

(58) Field of Classification Search
CPC ....... B60B 27/0047; B60B 27/04; B60B 1/06; B60B 3/10; B60B 21/064; B60B 2900/1216; B60B 19/00; B60B 19/10; B60B 7/00; B60B 7/04; B60B 7/20; B60B 7/066; B60B 7/002; B60B 7/0086
See application file for complete search history.

(56) References Cited

U.S. PATENT DOCUMENTS 11,077,707 B2 * 8/2021 Wong ...................... B60B 7/066
11,318,781 B2 * 5/2022 Kim .......................... B60B 7/20
2009/0195053 A1 * 8/2009 Kruse .................. B60B 7/0053 301/6.4
2021/0206199 A1 * 7/2021 Baigh .................. F04D 29/388

FOREIGN PATENT DOCUMENTS

CN 104742640 A * 7/2015
DE 4436543 A1 * 5/1995 ............. B27B 17/14
DE 102010015319 A1 * 10/2011 ............... B60B 7/04
DE 102016001365 A1 * 1/2017 ............... B60B 7/00
EP 3848208 A1 * 7/2021 ............... B60B 7/04
FR 2984219 A1 6/2013
KR 20160063095 A * 6/2016 ............... B60B 7/04

OTHER PUBLICATIONS

May 13, 2024 European Search Report issued in corresponding EP Application No. 23217018.3.

* cited by examiner

*Primary Examiner* — S. Joseph Morano
*Assistant Examiner* — Eva L Comino
(74) *Attorney, Agent, or Firm* — Clements Bernard Walker; Christopher L. Bernard

(57) ABSTRACT

A wheel and a motor vehicle. The wheel includes: a wheel hub; a wheel rim, connected to the wheel hub through a plurality of spokes, the plurality of spokes being spaced apart from each other to form a plurality of through spaces; and a plurality of baffles, movably installed to the wheel relative to the wheel hub and configured to move relative to the wheel hub in response to changes in a speed of a vehicle to provide different shielding degrees for corresponding through spaces among the plurality of through spaces.

13 Claims, 6 Drawing Sheets

WHEEL AND MOTOR VEHICLE

CROSS-REFERENCE TO RELATED APPLICATION

The present disclosure claims the benefit of priority of co-pending Chinese Patent Application No. 202211636715.7, filed on Dec. 15, 2022, and entitled "WHEEL AND MOTOR VEHICLE," the contents of which are incorporated in full by reference herein.

TECHNICAL FIELD

The present disclosure relates to a wheel and a motor vehicle. The wheel is configured to be able to adjust air resistance according to the speed of the vehicle, thereby improving the aerodynamic performance.

BACKGROUND

Generally, the vehicle has a streamlined shape in order to reduce air resistance, thereby improving the aerodynamic performance of the vehicle. However, the air resistance acting on the vehicle includes not only the upper resistance depending on the shape of the vehicle, but also the lower resistance generated by the wheels and tires. Therefore, the air resistance of the wheels and tires also needs to be ameliorated.

Because the motor vehicle is equipped with brakes, the wheel rim is open (spaces among spokes) to allow air to flow to cool the brakes. In this case, however, the open wheel rim will increase air resistance, especially at a high speed, resulting in more fuel/power consumption. Therefore, it is needed to control the coverage of the wheel rim and minimize the air resistance at a high speed, and increase the air flow as much as possible to cool the brakes in time at a low speed or at rest.

SUMMARY

The present disclosure has been proposed in consideration of the above problems occurring in the related art. The invention aims to provide a variable aerodynamic wheel, in which a baffle being movable relative to a wheel hub is applied between spokes of the wheel, so that the baffle provides different shielding degrees to the through space, thereby adjusting the air resistance and balancing the contradiction between reducing the air resistance and the heat dissipation requirement of the brakes, thereby improving the driving performance, energy consumption performance and fuel efficiency.

The present disclosure provides a wheel, which includes: a wheel hub; a wheel rim, connected to the wheel hub through a plurality of spokes, the plurality of spokes being spaced apart from each other to form a plurality of through spaces; and a plurality of baffles, movably installed to the wheel relative to the wheel hub and configured to move relative to the wheel hub in response to changes in a speed of a vehicle to provide different shielding degrees for corresponding through spaces among the plurality of through spaces.

Advantageously, a shielding degree of the corresponding through spaces among the plurality of through spaces is based on the speed of the vehicle or a wheel rotation speed.

Advantageously, the shielding degree of the corresponding through spaces among the plurality of through spaces increases with an increase of the speed of the vehicle.

Advantageously, the wheel further includes a plurality of baffles move relative to the wheel hub by using a centrifugal force generated by a rotation of the wheel upon the vehicle moving.

Advantageously, the wheel further includes a plurality of grooves arranged on the wheel hub, and the plurality of baffles are movably installed into corresponding grooves among the plurality of grooves through respective protrusions of the plurality of baffles, so as to be able to move relative to the wheel hub along specific trajectories under the corresponding grooves.

Advantageously, a trajectory of any one of the plurality of grooves is in a form of a logarithmic spiral curve with a starting end and a terminating end, and the starting end is closer to an origin point and the terminating end is further away from the origin point relative to a spiral direction of the logarithmic spiral curve.

Advantageously, a spring is arranged in each of the plurality of grooves, one end of the spring is connected to a protrusion of a corresponding baffle, and the other end of the spring is connected to the terminating end.

Advantageously, upon a slip rate of the vehicle being zero, a relationship between a shielding degree provided by a baffle and the speed of the vehicle is determined based on the following formula:

$$v_{flap} = a\sqrt{\frac{K \tan \alpha}{m} \cdot \cos\alpha \cdot e^{(cot\,\alpha)\cdot\theta}\left[\theta \cdot e^{(cot\,\alpha)\cdot\theta} + \tan\alpha\left(1 - e^{(cot\,\alpha)\cdot\theta}\right)\right]} \quad (1)$$

$$v_{car} = \frac{R_w}{\rho} v_{flap} \quad (2)$$

wherein, $v_{flap}$ is a linear velocity of a mass center of the baffle, the mass center is configured to be located on a trajectory of a corresponding groove, $R_w$ is a radius of the wheel, ρ is a polar radius, $v_{car}$ is the speed of the vehicle, a is a polar radius of the starting end, α is an included angle between a tangent of any point on the logarithmic spiral curve and the polar radius, m is mass of a single baffle, and K is a stiffness of the spring, θ indicates a polar angle in polar coordinates, which describes the shielding degree, the greater the θ, the greater the shielding degree.

Advantageously, the vehicle further includes a driving mechanism installed to the wheel hub and configured to drive the plurality of baffles to rotate in a circumferential direction relative to the wheel hub upon the vehicle moving.

Advantageously, the driving mechanism includes: a motor, arranged in the wheel hub; a transmission assembly, connected to a rotor of the motor and the plurality of baffles and configured to cause the plurality of baffles to rotate upon the rotor of the motor rotating.

Advantageously, the transmission assembly includes: a center gear, connected to the rotor of the motor and configured to rotate together with the rotor; a plurality of transmission gears, arranged around the central gear, connected with each other through a gear frame, and meshed with the central gear; and a gear ring, arranged around the plurality of transmission gears, meshed with the plurality of transmission gears, the plurality of baffles being installed on the gear ring and being able to rotate together with the gear ring.

Advantageously, the motor is configured to, upon the speed of the vehicle being smaller than a predetermined threshold value, make a rotation angle of the baffle change with the speed of the vehicle based on the following formula: θ=K·vcar.

Advantageously, the motor is configured to, upon the speed of the vehicle being larger than or equal to the predetermined threshold value, make the rotation angle of the baffle to completely cover a corresponding through space among the plurality of through spaces.

Advantageously, the predetermined threshold is 140 km/h.

The present disclosure further provides a motor vehicle, which includes the wheel as described above.

BRIEF DESCRIPTION OF DRAWINGS

The advantages and objectives of the present disclosure can be better understood in the following detailed description of preferred embodiments of the present disclosure with reference to the accompanying drawings. The drawings are not drawn to scale in order to better show the relationship between the components in the drawings.

DETAILED DESCRIPTION

Figure 1:
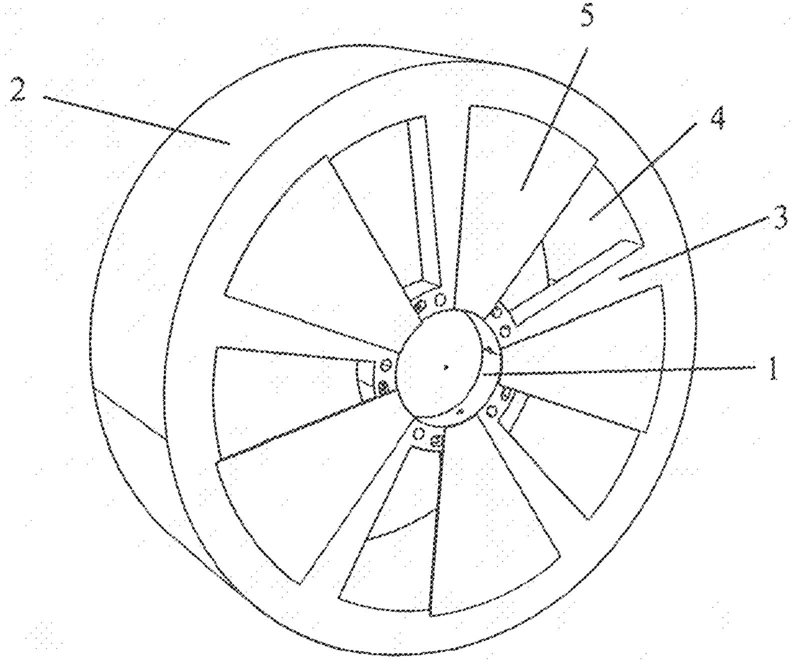
FIG. 1 shows a perspective view of a wheel according to a first embodiment of the present application.

Various embodiments according to the present disclosure will be described in detail with reference to the accompanying drawings. Herein, it should be noted that, in the drawings, the same reference numerals are given to components having basically the same or similar structures and functions, and repeated descriptions about them will be omitted. The term "including A, B, C, etc. in sequence" only indicates the arrangement order of included components A, B, C, etc., and does not exclude the possibility of including other components between A and B and/or between B and C. In the following description, directional terms may be used for convenience. It should be pointed out that the directions appearing here are only for convenience of description, and the present disclosure is not limited thereto. Under different orientations, the features may have different directions.

The attached drawings in the present specification are schematic diagrams to help explain the concept of the invention, and schematically show the shapes of various parts and their relationships.

FIG. 1 shows a perspective view of a wheel of a first embodiment of the present application. The wheel includes a wheel hub 1, a wheel rim 2 and a plurality of spokes 3 connected between the wheel hub 1 and the wheel rim 2. The wheel hub 1 is connected with an axle of the vehicle, and the wheel hub is equivalent to an "inner ring" of the wheel, and the wheel rim is equivalent to an "outer ring" of the wheel. The plurality of spokes 3 are arranged to be spaced apart from each other to define a plurality of through spaces 4 between the plurality of spokes to allow air to pass therethrough. A plurality of baffles 5 are movably installed to the wheel relative to the wheel hub, and are configured to move relative to the wheel hub in response to changes in a speed of the vehicle, so as to provide different shielding degrees for corresponding through spaces among the plurality of through spaces. In particular, the baffles move relative to the wheel hub by using a centrifugal force generated by a rotation of the wheel upon the vehicle moving.

Figure 2:
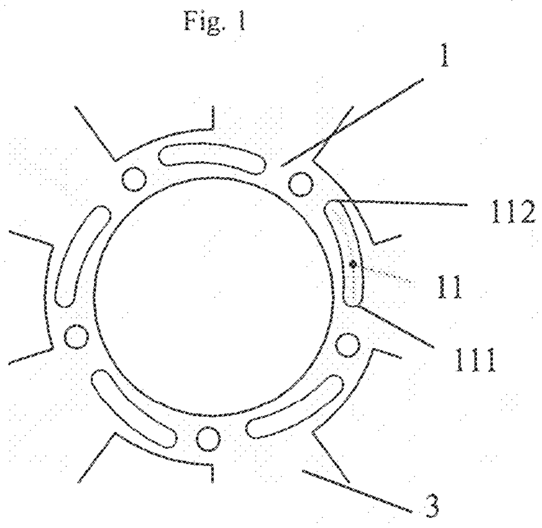
FIG. 2 shows a plan view of a wheel hub according to a first embodiment of the present application, with the baffles removed to show grooves of the wheel hub for installing the baffles.

FIG. 2 shows an enlarged view of the wheel hub. As illustrated by FIG. 2, the wheel hub 1 includes a plurality of grooves 11 arranged on the wheel hub, and protrusions 51 of the plurality of baffles 5 are movably arranged in corresponding grooves among the plurality of grooves 11. In this specification, five grooves and five baffles are shown, but those skilled in the art should understand that this is only an example, and an appropriate number of grooves and baffles can be provided as required.

Figure 3:
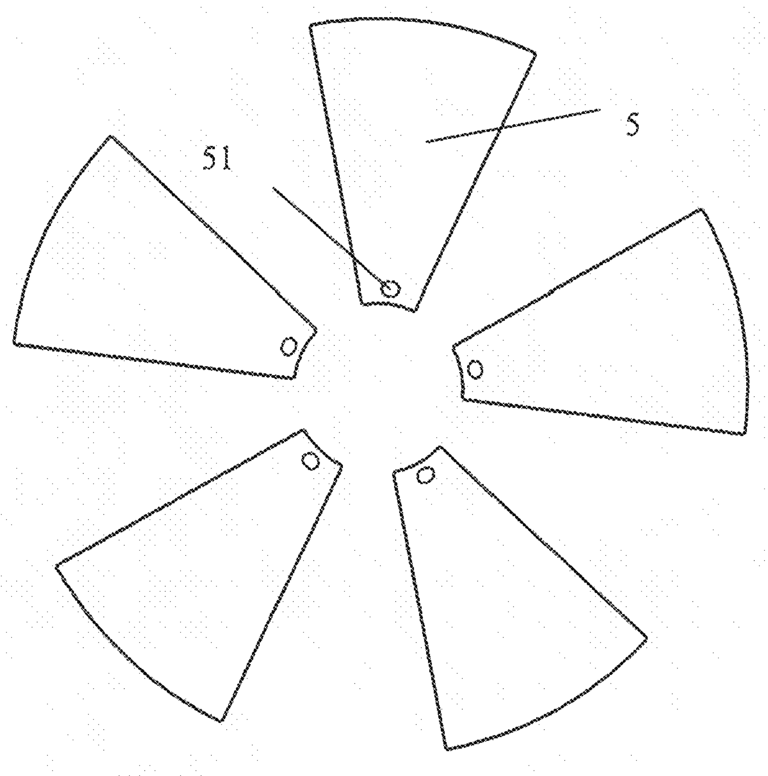
FIG. 3 shows a plan view of a plurality of baffles according to a first embodiment of the present application.

Specifically, the plurality of baffles 5 each have a protrusion 51, as illustrated by FIG. 3, which is movably installed in a corresponding groove of the plurality of grooves 11, so that the plurality of baffles move relative to the wheel hub under the guidance of the plurality of grooves.

Each of the plurality of grooves 11 is in the form of a logarithmic spiral curve, and has a starting end 111 and a terminating end 112, the starting end is closer to the origin point and the terminating end is further away from the origin point relative to a spiral direction of the logarithmic spiral curve. The angle corresponding to the logarithmic spiral curve depends on the number of baffles, that is, the logarithmic spiral curve is selected based on the number of baffles.

Figure 5:
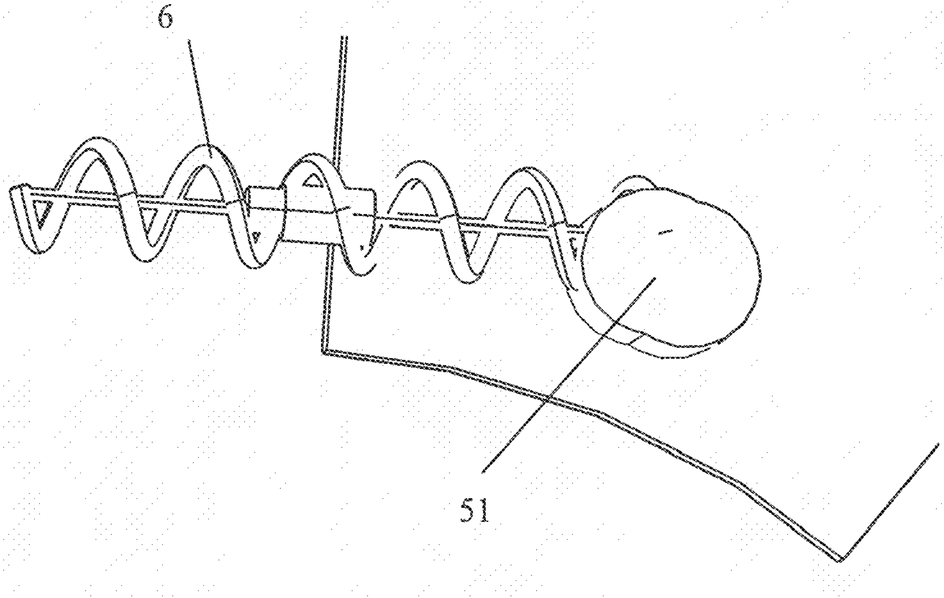
FIG. 5 shows a schematic diagram of the connection between a protrusion of a baffle and a spring.

A spring 6 is disposed in each groove 11, and one end of the spring is connected to the protrusion 51, and the other end is connected to the terminating end, as illustrated by FIG. 5, which shows the connection between the protrusion 51 and the spring 6. The protrusion 51 is arranged in the groove so as to be clamped in the groove, and the spring also provides support for the protrusion 51 and the baffle, and in this case, the spring balances the component force in the tangential direction of the centrifugal force generated upon the component rotating.

During the moving of the vehicle, the shielding degree for the through space provided by the baffle 5 will change based on the speed of the vehicle, and the relationship between the shielding degree and the speed of the vehicle will be described in detail below.

Figure 6:
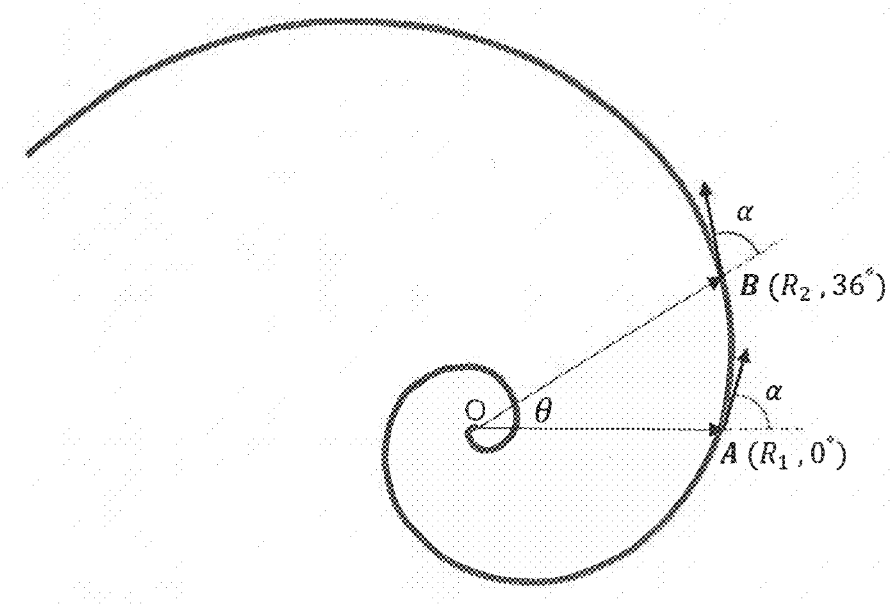
FIG. 6 shows a logarithmic spiral curve.

FIG. 6 shows a mathematical model of a logarithmic spiral curve of the groove 11. It is assumed that the groove corresponds to a section of the logarithmic spiral curve shown in FIG. 6 from point A to point B, that is, point A corresponds to the starting end of the groove and point B corresponds to the terminating end of the groove. The characteristic of logarithmic spiral curve is that the angle between the normal vector of the curve and the polar radius is always the same.

The polar coordinates are expressed by the following formula:

$$\rho = a \cdot e^{k\theta} \quad (1)$$

Where, the constant "a" is the polar radius of point A (i.e. the starting end), and the constant "k" is the cotangent of the angle between the polar radius and the tangent direction, that is, R=cot α, α is the angle between the tangent of any point on the logarithmic spiral curve and the polar radius, which is constant for the logarithmic spiral curve, and θ represents a polar angle, the angle around which a connection line between a point and the origin in polar coordinates revolves relative to the polar axis, and describes a movement of the baffle. The greater the θ, the greater the shielding degree is. In the present application, when the baffle moves through 36 degrees, the baffles will completely cover the through spaces, so the maximum value of θ can be selected as 36 degrees, that is, the included angle between the polar radius of point A and the polar radius of point B is 36 degrees. Of course, the maximum value depends on the number of through spaces and the number of baffles.

Figure 7:
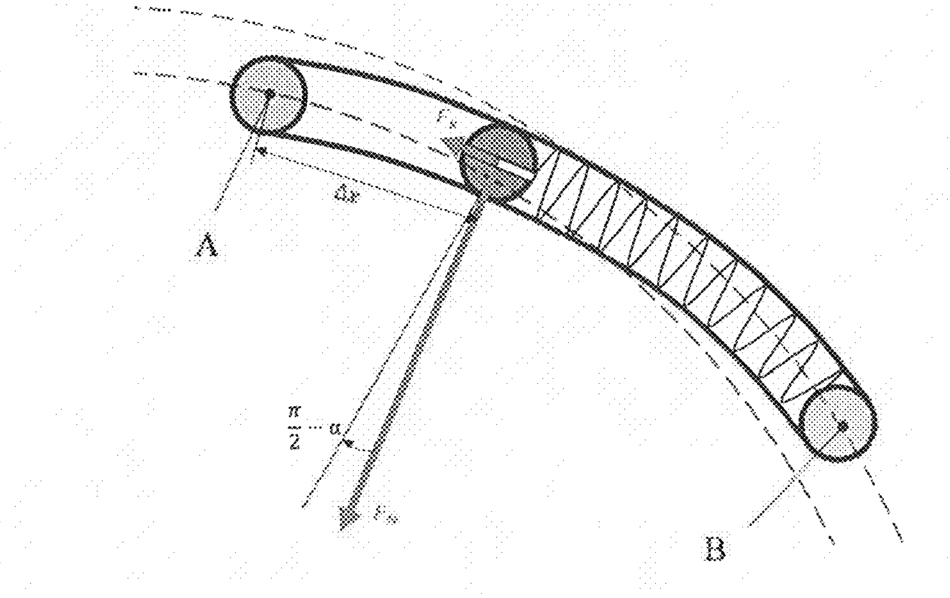
FIG. 7 shows a force diagram of a position of a mass center of the baffle (in which the gravity of the baffle itself is very small and can be ignored).

FIG. 7 shows a schematic diagram drawn to calculate the relationship between the shielding degree and the speed of the vehicle. As the vehicle starts moving, due to the centrifugal force generated by the rotation of the wheel, the baffle 5 moves along the groove 11 relative to the wheel hub, thus compressing the spring 6 by a distance Δx. In the state shown in FIG. 7, assuming that the baffle 5 is in a stable state, then the component force in the tangential direction along the rotation trajectory of the centrifugal force on the protrusion 51 is equal to the compression force of the spring. Based on this principle, the relationship (5) between θ and the linear velocity of the mass center of the baffle can be obtained through the following three formulas (2) to (4).

$$F_N/\sin\alpha = \frac{mv_{flap}^2}{a \cdot e^{\theta \cdot \cot\alpha}} \quad (2)$$

$$F_k = K\Delta x = F_N \cot\alpha \quad (3)$$

$$\Delta x = a\int_0^{\theta} \theta e^{(\cot\alpha)\cdot\theta} d\theta = a \cdot \left[\tan\alpha \cdot \theta \cdot e^{(\cot\alpha)\cdot\theta} + \tan\alpha^2 \cdot \left(1 - e^{(\cot\alpha)\cdot\theta}\right)\right] \quad (4)$$

$$v_{flap} = a\sqrt{\frac{K\tan\alpha}{m} \cdot \cos\alpha \cdot e^{(\cot\alpha)\cdot\theta}\left[\theta \cdot e^{(\cot\alpha)\cdot\theta} + \tan\alpha\left(1 - e^{(\cot\alpha)\cdot\theta}\right)\right]} \quad (5)$$

where, $v_{flap}$ is a linear velocity of the mass center of the baffle, the mass center is configured to be located on a trajectory of a corresponding groove, a is a polar radius of the starting end, α is an included angle between a tangent of any point on the logarithmic spiral curve and the polar radius, m is mass of a single baffle (the mass of the baffle is relatively small, so that the mass center of the baffle is located on the moving trajectory, which can be regarded as a moving particle on the moving trajectory equivalently), K is a stiffness of the spring, θ indicates a polar angle in polar coordinates, $F_K$ is a force exerted on the baffle upon the spring being compressed, and $F_N$ is a force exerted on the baffle by the groove, and a direction of which is a normal direction of the trajectory of the groove.

The above description is mainly aimed at the case that the slip rate of the vehicle is zero, that is, the wheel does not slip. During the normal moving of the vehicle, the speed of the vehicle has a corresponding conversion relationship with the wheel rotation speed, which is well known to those skilled in the art.

Next, referring to the following formula (6) describing the speed of the vehicle and the linear speed of the baffle, the relationship between the shielding degree and the speed of the vehicle can be obtained.

$$v_{car} = \frac{R_w}{\rho} v_{flap} \quad (6)$$

where, $v_{car}$ is the speed of the vehicle, $R_w$ is the radius of the wheel, and ρ is the polar radius.

Therefore, θ can change with the speed of the vehicle, specifically, it can increase with the increase of the speed of the vehicle. Next, the relationship between θ and the speed of the vehicle will be described with an example.

Figure 8:
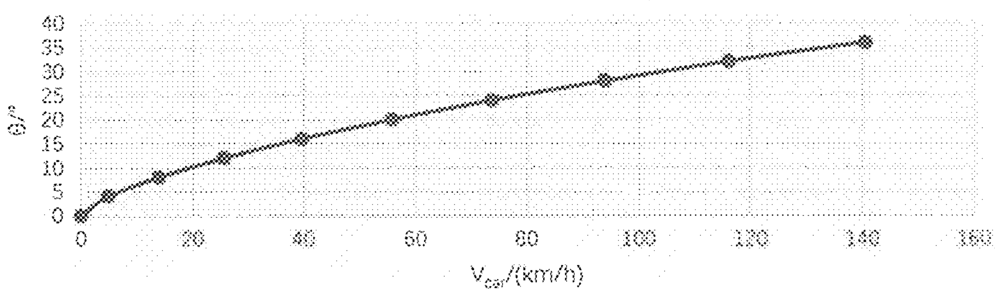
FIG. 8 shows a graph of a shielding degree and a speed of the vehicle.

Assuming that a, a, K, and m take the values shown in Table 1 below and substitute the following values into the above formula for calculation, the graph shown in FIG. 8 can be drawn, it can be seen from the graph that 0 can be directly proportional to the speed of the vehicle.

TABLE 1

| | |
|---|---|
| a (mm) | 62 |
| α(°) | 70 |
| K(N/m) | 18800 |
| m(kg) | 0.01 |

Figures 4A, 4B, 4C:
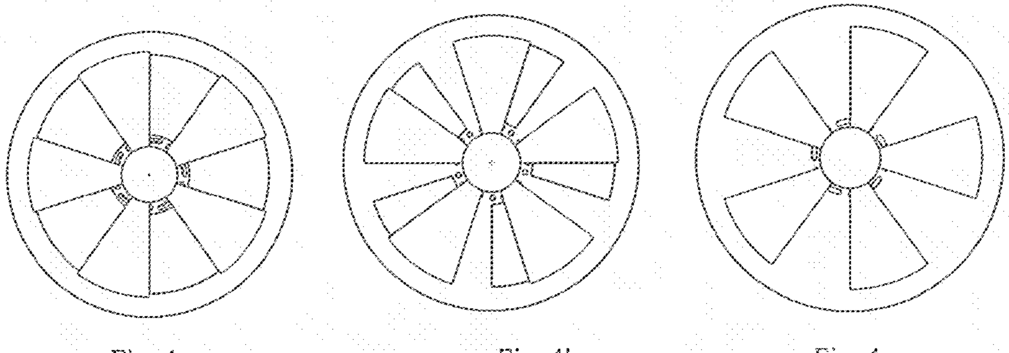
FIGS. 4*a*-4*c* show state diagrams in which the plurality of baffles provide different shielding degrees.

As a result, with the change of speed of vehicle, θ can change correspondingly, so as to change between the three states shown in FIGS. 4*a*-4*c*, which respectively show a state that the baffles does not cover the through spaces (the shielding degree is 0%), a state that the baffles covers a part of the through spaces (the shielding degree is between 0% and 100%), and a state that the baffles completely cover the through spaces (the shielding degree is 100%).

In the above description, the baffles do not need any driving mechanism or any external power supply, but only depend on the centrifugal force generated upon the wheel rotating. Therefore, the plurality of baffles can automatically move based on the speed of the vehicle, thereby providing different shielding degrees to the through space among the plurality of spokes, so as to automatically adjust the air resistance.

In the following second embodiment, an example in which a driving mechanism is used to drive the baffles to rotate is described. The main difference between the second embodiment and the first embodiment lies in that, in the second embodiment, the driving mechanism controls the rotation angles of the plurality of baffles based on the speed of the vehicle.

Figure 9:
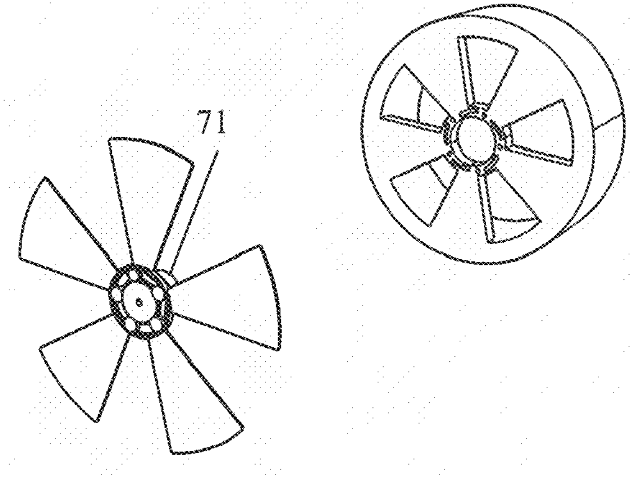
FIG. 9 shows an exploded view of a driving mechanism according to the second embodiment.
Figure 10:
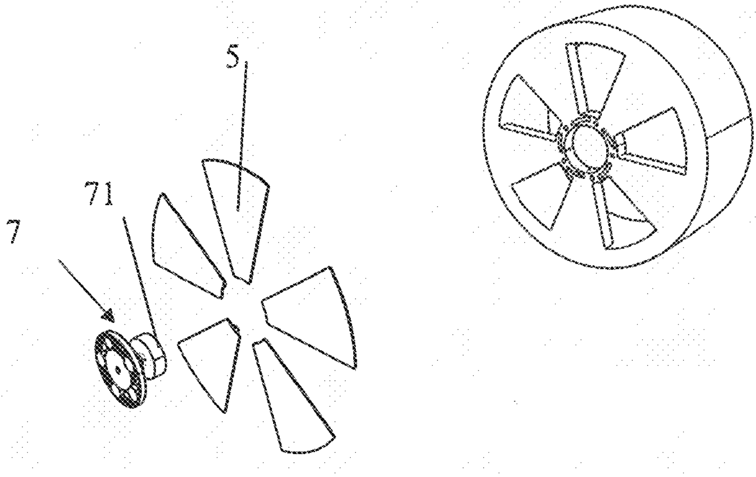
FIG. 10 shows an exploded view of another driving mechanism according to the second embodiment.
Figure 11:
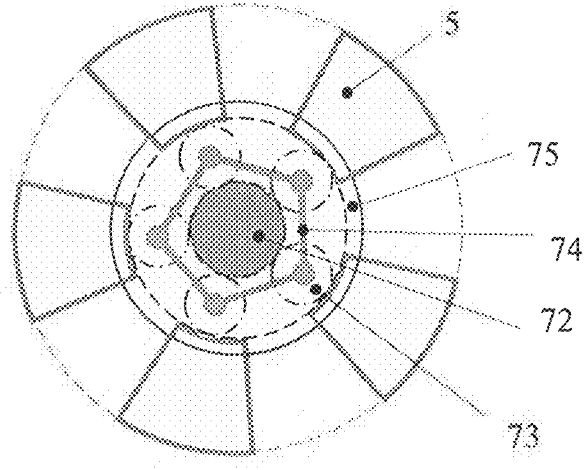
FIG. 11 shows a schematic plan view of a transmission assembly.

As illustrated by FIGS. 9 and 10, a wheel of the second embodiment is shown. The wheel includes a driving mechanism 7 and a transmission assembly; the driving mechanism 7 includes a motor 71 arranged in the wheel hub 1, and the transmission assembly is connected to the rotor of the motor and the plurality of baffles, and can cause the plurality of baffles to rotate upon the rotor of the motor rotating. As illustrated by FIG. 11, the transmission assembly includes: a center gear 72 connected to the rotor of the motor and configured to rotate together with the rotor; a plurality of transmission gears 73, which are arranged around the central gear 72, connected with each other through a gear frame 74, and meshed with the central gear 72; and a gear ring 75, arranged around the plurality of transmission gears 73 and meshed with the plurality of transmission gears 73, and the plurality of baffles 5 are installed to the gear ring 75 and can rotate together with the gear ring 75.

When the rotor of the motor rotates, the central gear 72 is driven to rotate, so that the transmission gears 73 rotate around the central gear, and then the gear ring 75 rotates circumferentially together with the plurality of baffles 5.

In this second embodiment, the motor is configured to, upon the speed of the vehicle being less than a predetermined threshold (for example, 140 km/h), make the rotation angle of the baffle change with the speed of the vehicle based on the following formula: $\theta = K \cdot v_{car}$. Upon the speed of the vehicle being greater than or equal to the predetermined threshold, the motor is configured to make the rotation angle of the baffle to completely cover a corresponding through space among the plurality of through spaces. In this second embodiment, the rotation angle of the baffle is set to be 36 degrees at this time. It should be understood by those skilled in the art that the value of the rotation angle that completely covers the through spaces depends on the number of through spaces and the number of baffles. The motor is controlled by a controller, which is not shown, and the use of the controller to control the motor is well known to those skilled in the art, so it will not be described in detail here.

Figure 12:
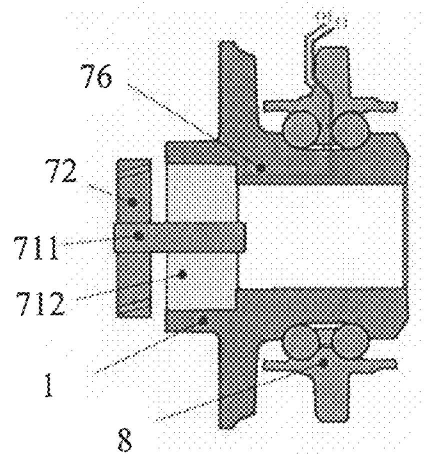
FIG. 12 shows a schematic diagram of supplying power to a motor.

For the second embodiment, in order to supply power to the motor, as illustrated by FIG. 12, a wire 76 can be integrated in the bearing 8 and the wheel hub 1 to supply power to the motor. FIG. 12 also shows that the stator 712 of the motor 7 is arranged in the wheel hub 1, and the rotor 711 is connected with the center gear 72. The power supply mode described in the present disclosure is just an example, and those skilled in the art should understand that there can be any other power supply mode as long as it can supply power to the motor.

It is obvious to those skilled in the art that the present disclosure is not limited to the details of the above-mentioned exemplary embodiments, but can be realized in other specific forms without departing from the spirit or essential characteristics of the present disclosure. Therefore, the embodiments should be considered in all aspects as illustrative and not restrictive, and the scope of the invention is defined by the appended claims rather than the above description, so it is intended to embrace all changes that come within the meaning and range of equivalents of the claims. Any reference signs in the claims shall not be construed as limiting the claims concerned.

The invention claimed is:

1. A wheel, comprising:

a wheel hub;

a wheel rim, connected to the wheel hub through a plurality of spokes, the plurality of spokes being spaced apart from each other to form a plurality of through spaces;

a plurality of baffles, movably installed to the wheel relative to the wheel hub and configured to move relative to the wheel hub in response to changes in a speed of a vehicle to provide different shielding degrees for a corresponding through space among the plurality of through spaces; and a plurality of grooves arranged on the wheel hub, wherein the plurality of baffles are movably installed into corresponding grooves among the plurality of grooves through respective protrusions of the plurality of baffles, so as to be able to move relative to the wheel hub along a specific trajectory under a guidance of corresponding grooves;

wherein a trajectory of any one of the plurality of grooves is in a form of a logarithmic spiral curve with a starting end and a terminating end, and the starting end is closer to an origin point and the terminating end is further away from the origin point relative to a spiral direction of the logarithmic spiral curve.

2. The wheel according to claim 1, wherein a shielding degree of the corresponding through space among the plurality of through spaces is based on the speed of the vehicle or a wheel rotation speed.

3. The wheel according to claim 2, wherein the shielding degree of the corresponding through space among the plurality of through spaces increases with an increase of the speed of the vehicle.

4. The wheel according to claim 2, further comprising a driving mechanism installed to the wheel hub and configured to drive the plurality of baffles to rotate in a circumferential direction relative to the wheel hub upon the vehicle moving.

5. The wheel according to claim 4, wherein the driving mechanism comprises:

a motor, arranged in the wheel hub; and a transmission assembly, connected to a rotor of the motor and the plurality of baffles and configured to cause the plurality of baffles to rotate upon the rotor of the motor rotating.

6. The wheel according to claim 5, wherein the transmission assembly comprises:

a center gear, connected to the rotor of the motor and configured to rotate together with the rotor;

a plurality of transmission gears, arranged around the central gear, connected with each other through a gear frame, and meshed with the central gear; and a gear ring, arranged around the plurality of transmission gears, meshed with the plurality of transmission gears, the plurality of baffles being installed on the gear ring and being able to rotate together with the gear ring.

7. The wheel according to claim 5, wherein the motor is configured to, upon the speed of the vehicle being smaller than a predetermined threshold value, make a rotation angle of the baffle change with the speed of the vehicle based on the following formula: $\theta = K \cdot v_{car}$.

8. The wheel according to claim 7, wherein the motor is configured to, upon the speed of the vehicle being larger than or equal to the predetermined threshold value, make the rotation angle of the baffle to completely cover a corresponding through space among the plurality of through spaces.

9. The wheel according to claim 8, wherein the predetermined threshold is 140 km/h.

10. The wheel according to claim 1, wherein the plurality of baffles move relative to the wheel hub by using a centrifugal force generated by a rotation of the wheel upon the vehicle moving.

11. The wheel according to claim 1, wherein a spring is arranged in each of the plurality of grooves, one end of the spring is connected to a protrusion of a corresponding baffle, and the other end of the spring is connected to the terminating end.

12. The wheel according to claim 11, wherein, upon a slip rate of the vehicle being zero, a relationship between a shielding degree provided by a baffle and the speed of the vehicle is determined based on the following formula:

$$v_{flap} = a\sqrt{\frac{K \tan\alpha}{m} \cdot \cos\alpha \cdot e^{(\cot\alpha)\cdot\theta}\left[\theta \cdot e^{(\cot\alpha)\cdot\theta} + \tan\alpha\left(1 - e^{(\cot\alpha)\cdot\theta}\right)\right]} \quad (1)$$

$$v_{car} = \frac{R_w}{\rho} v_{flap} \quad (2)$$

wherein, $v_{flap}$ is a linear velocity of a mass center of the baffle, the mass center is configured to be located on a trajectory of a corresponding groove, $R_w$ is a radius of the wheel, ρ is a polar radius, $v_{car}$ is the speed of the vehicle, α is a polar radius of the starting end, α is an included angle between a tangent of any point on the logarithmic spiral curve and the polar radius, m is a mass of a single baffle, and K is a stiffness of the spring, θ indicates a polar angle in polar coordinates, which describes the shielding degree, the greater the θ, the greater the shielding degree.

13. A motor vehicle, comprising:

a wheel, comprising:

a wheel hub;

a wheel rim, connected to the wheel hub through a plurality of spokes, the plurality of spokes being spaced apart from each other to form a plurality of through spaces;

a plurality of baffles, movably installed to the wheel relative to the wheel hub and configured to move relative to the wheel hub in response to changes in a speed of a vehicle to provide different shielding degrees for a corresponding through space among the plurality of through spaces; and a plurality of grooves arranged on the wheel hub, wherein the plurality of baffles are movably installed into corresponding grooves among the plurality of grooves through respective protrusions of the plurality of baffles, so as to be able to move relative to the wheel hub along a specific trajectory under a guidance of corresponding grooves;

wherein a trajectory of any one of the plurality of grooves is in a form of a logarithmic spiral curve with a starting end and a terminating end, and the starting end is closer to an origin point and the terminating end is further away from the origin point relative to a spiral direction of the logarithmic spiral curve.

* * * * *